Jan. 24, 1967  M. E. TALAAT  3,300,661
THERMIONIC ENERGY CONVERTER
Filed Nov. 15, 1961  2 Sheets-Sheet 1

INVENTOR.
M. E. TALAAT
BY
ATTORNEY

INVENTOR.
M. E. TALAAT

United States Patent Office 3,300,661
Patented Jan. 24, 1967

3,300,661
THERMIONIC ENERGY CONVERTER
Mostafa E. Talaat, Towson, Md., assignor to Martin-Marietta Corporation, Baltimore, Md., a corporation of Maryland
Filed Nov. 15, 1961, Ser. No. 152,506
2 Claims. (Cl. 310—4)

This invention relates to a device for directly converting thermal energy to electrical energy, and more specifically it relates to a thermionic energy converter operable with high temperature heat sinks.

Various techniques for converting thermal energy directly to electrical energy have been devised wherein an ionizable vapor is employed in confinement between two surfaces maintained at different temperatures and having different values of thermionic work function.

A typical converter arrangement is characterized by the utilization of vapor ions to act as carriers to transmit charges from one surface to another. Such a converter is described in a U.S. patent to Hansell, No. 2,510,397.

Another converter arrangement may have an ionizable vapor in the interelectrode space serving to facilitate thermal electron emission from the emitter electrode by lowering its work function and facilitate the electron transfer to the collector electrode by providing positive ions in the interelectrode space to neutralize the electron space charge, thereby generating a plasma within the interelectrode space. In the arrangement, as typically described in a patent to Feaster, No. 2,980,819, the ions do not serve as the principal charge carriers, the charge carriers are for the most part the thermally emitted electrons, with the positive vapor ions serving mainly to neutralize the negative space charge which would otherwise exist in the interelectrode space.

This invention is concerned primarily with the latter principle of operation, which will be referred to hereinafter as a thermionic converter.

Vapor materials used in present converters are restricted to elements or compounds having a low value of ionization potential and a low work function, since in either of the aforementioned converter arrangements, ionization must necessarily be thermally effected upon contact with a hot surface whose work function is higher or slightly less than the ionization potential of the vapor.

The most typical of these conventional vaporous materials is cesium, although others have been chosen from among the alkaline metals. A particular disadvantage of converters having conventional alkali vapor materials resides in the corrosive action of the said vapors with compartment seals and similar converter components. This action produces destructive air leaks, consequently, seriously shortening converter reliability and life expectancy.

To be operative in converter arrangements, vaporous materials must be carefully maintained at a point within a somewhat restrictive vapor pressure range, this range being typically from 0.0001 mm. of Hg to 10 mm. of Hg. When alkali vapor materials are used, the vapor pressures are very sensitive functions of the minimum alkali metal temperature residing within the converter and through somewhat intricate temperature control, a portion of the vapor may be advantageously condensed upon the collector electrode of a converter to produce a marked lowering of the work function of that surface to allow facile electron collection. Also, by maintaining a relatively low collector temperature, thermally actuated back emission of electrons may be minimized, thereby enhancing conversion efficiency.

When utilizing conventional alkali vapor materials as cesium with high temperature heat sinks, operating liquid metal temperatures having a prescribed temperature value to yield the vapor pressure at which optimum electrical performance takes place cannot be maintained independently of the heat sink temperature unless a somewhat elaborate auxiliary temperature-pressure adjustment mechanism is provided. In applications demanding strict weight limitations and where reliability of the electric power suorce is of a primary importance, this auxiliary mechanism would not be desirable. In those applications requiring the utilization of both high temperature heat sources and additionally high temperature heat sink operation as may be encountered in space applications using the exhaust gases of a rocket engine or a radioisotope, conventional thermionic converters are not acceptable. Typically, such thermal energy is provided at temperatures in the order of 2100° K., a figure well above the operating temperature capacities of conventional converters requiring an additional heat sink function of operation.

In accordance with the instant invention, a more efficient thermionic heat to electricity converter is provided which is simply controlled and operable for high temperature heat sink applications as described but without auxiliary or special temperature-pressure regulating devices such as reservoirs, electrical vaporization devices and the like. The invention is further characterized in utilizing a vaporous material, particularly barium vapor, which is essentially non-corrosive, thereby providing a conversion device of substantially long operating lifetime. Another aspect portrays the invention in its high reliability and unique ability to convert heat to electricity utilizing a very high temperature heat sink which acts as a heat dump to that portion of the high temperature heat energy rejected after an energy conversion process. This rejected heat energy may be transmitted by radiation to a space environment or conducted to further contiguous heat energy actuated equipment. It is a further object of this invention to provide a thermionic heat to electricity converter, the vapor of which has a high atomic weight so that the required ion current therein will have an essentially low value, and which vapor will be ionizable upon contact with a hot surface. The vapor material may be particularly characterized by its ability to condense on the cooler electrode of the converter under relatively high collector operational temperatures to provide therewith a desirable low work function collector.

Another aspect of this invention provides a heat to electrical energy conversion device having a dual form emitting and ionizing electrode, interstices upon which are arranged to provide separate regions of thermal electron emission and vapor ionization.

Other objects and advantages are provided in the following detailed description of the invention when read in conjunction with the drawings in which.

Figure 1:
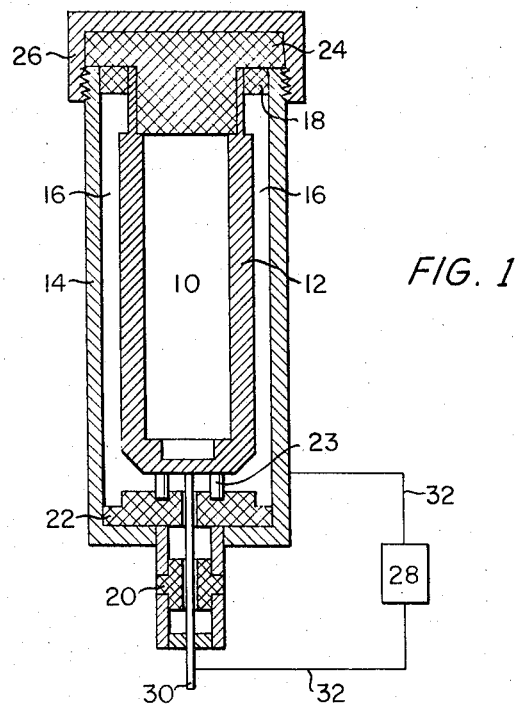
FIGURE 1 illustrates a schematic embodiment of the instant invention for converting heat energy to electrical energy and, FIGURE 2 represents operational characteristic curves of the device.

Referring to FIGURE 1, there is shown a converter adapted to be used with a high temperature heat source such as an isotope. The converter comprises a generally cylindrical "cathode" or "emitter" electrode 12 confining a heat source 10 and disposed concentrically within and spaced from a generally cylindrical "anode" or "collector" electrode at 14. As elaborated upon more fully hereinafter, the surface of emitter 12 may be fashioned having two distinct regions, the function of one being devoted for the most part to electron emission and the other, to vapor ionization.

Seals 18 and 20 in conjunction with electrodes 12 and 14, provide a vacuum tight vapor-containing compartment 16 between the electrodes, and may be composed of a high temperature ceramic such as $Al_2O_3$, $ZrO_2$, $ThO_2$, HfO, BeO, MgO or an equivalent, which also may be combined with metals both capable of withstanding high temperature and of being joined to the ceramic by a brazing process or the like. Seal 20 also serves to assure vacuum integrity for introducing a lead wire 30 into the converter to provide suitable electrical connection with cathode 12. End members 22 and 24 are provided as insulators and may also comprise materials as chosen for seals 18 and 20. Cathode 12 is provided support upon end member 22 by separator rods 23. The converter arrangement is provided access to the heat source 10 by means of a cap 26 threadably engaged to the exterior of the electrode 14. A load impedance is depicted generally at 28 and is shown in connection with electrode 14 and emitter lead 30 by any suitable circuitry 32. A particular characteristic of the embodiment described is the absence of envelopes or similar appurtenances containing a vapor source such as an alkali metal which serves to liberate vapors within compartment 16.

The cathode 12, being juxtaposed to heat source 10, absorbs a substantial portion of the heat emanating therefrom and, using the energy thusly derived, emits electrons from one region of its outward surface to impinge upon collector 14, while ionizing at another region the vapor as confined in the compartment 16.

This characteristic operation of converters derives from a consideration of saturation electron emission current given by Richardson's equation:

$$J = AT^2 \exp(-eo/kT)$$

where:

$O$ = surface work function
$A$ = transmission constant
$J$ = saturation electron emission current
$T$ = surface temperature
$e$ = electron charge
$k$ = Boltzman constant The current values obtained through the use of the equation are those which would flow in the case of a zero electric field at the emitter cathode. In a vacuum device, as soon as a current is drawn, a space charge is formed which repels most of the emitted electrons back to the emitting cathode. In other words, as a consequence of the space charge resulting from electron emission, a repelling field exists at the emitter surface which is different from zero and the current becomes much less than that given by the equation.

Since the space charge described above would effectively reduce the output current of the thermionic converter except under a very close spacing arrangement (less than $\frac{1}{1000}$ of an inch) between the emitter and collector, difficulties in fabricating converters with sufficiently close spacing would arise.

By injecting positive ions into the inter-electrode space, however, the space charge of the electrons can be neutralized. Since ions move much more slowly than the electrons, the ion current needed for space charge neutralization is desirably much smaller than the electron current to effect a negligible diminution of total output current. The ions used for space charge neutralization can be produced at a hot surface of sufficiently high work function upon which the neutral vapor atoms, having a reasonable ionization potential are impinging.

In another observation as may be seen from the Richardson equation, the emission current of material may be made very large by maintaining the emitter at an extremely high temperature. A limitation is inherent, of course, in that evaporation will also increase with increasing temperature thereby giving any emitter material a temperature-limiting span of operational life.

Generally, emission is large for a low work function material and it follows that for a reasonable output voltage, the emitter work function be conventionally larger than that of the collector by an amount in the order of 1 to 2 volts. From the viewpoint of power density, the exponential dependence of current density on work function usually dominates a reduction in emitter-collector work function difference. It therefore becomes desirable to find emitter and collector materials having appropriate work function characteristics while at the same time being capable of very high temperature operation.

The instant invention has initially met this two-fold requirement by a unique vapor selection.

In choosing a vapor material operable in the instant invention, awareness must be made of a series of considerations. The minimum temperature and consequently the vapor pressure of vapors within the device is dependent upon the temperature at which the collector electrode is held. Unless this pressure is held at an optimum value for a given inter-electrode spacing (a typical value would be 1 mm. Hg) the electrical performance of the converter must be compromised. The vapor selected for use with the instant device may be barium, strontium, lanthanum or calcium.

Especially important regarding the use of these vapors is the circumstance that they are adsorbed on the emitter and collector surfaces, thereby providing for the radical alteration of the thermionic emission properties of those surfaces. The work functions of the collector and emitter are, in general, lowered by the adsorbed atoms and thus, in the instant vapor-filled converter, the electrodes may have work functions not identical with the work functions of their base material but which are functions of vapor pressure and electrode temperature. In detail, work function adjustment is effected at the emitter and the collector electrodes as follows:

At the collector, the temperature must be sufficiently low such that a high fractional coverage or complete coverage by the vaporous material takes place, hence the material of the collector takes on a very low value of work function. This work function is primarily dependent upon the work function of the adsorbed vapor atoms and hence its value is substantially retained even if the material which is evaporated from the emitter is deposited upon the collector, provided that it may be "wetted" by the vapor.

A lowering of the work function with the use of these vapor materials has been found to also take place at the surface of the emitter.

As previously noted, a particularly outstanding member of the group is barium, the properties of which are compared hereinbelow with the conventional vaporous material, cesium. For high temperature heat sink operation such as would require a collector temperature of 1130° K., the use of barium vapor and the like will ideally provide the optimum vapor pressure required. Table I as given below illustrates this advantageous relationship between vapor pressure and temperature for barium in comparison with cesium vapors. Obviously, the use of cesium vapors and the like in high temperature heat sink applications would necessitate somewhat elaborate and extraneous pressure control schemes for an optimum pressure on the order of one mm. Hg, whereas no such controls are required with the use of barium. The vapor pressure of barium is in the range of $10^{-4}$ mm. to 1 mm. Hg, the region of interest in energy conversion, at temperatures on the order of about 750° to 1100° K.

TABLE I

| | Pressure in mm. of Hg | | | | | | | | |
|---|---|---|---|---|---|---|---|---|---|
| | $10^{-5}$ | $10^{-4}$ | $10^{-3}$ | $10^{-2}$ | .1 | 1 | 5 | 10 | 20 |
| Temp. for cesium, °K | 318 | 347 | 383 | 426 | 480 | 550 | 614 | 648 | 682 |
| Temp. for barium, °K | 698 | 749 | 819 | 902 | 1,003 | 1,131 | 1,257 | 1,322 | 1,393 |

The inter-electrode spacing of the device will not be a critical factor in utilizing barium since the electrode mean-free path will be large in comparison to readily obtainable spacings of about 0.050 inch. This is due to the fact that the cross-section for low energy-electron scattering by barium is estimated at an order of magnitude smaller than that of cesium. Hence the electron mean-free path in a barium vapor filled device is much larger than that in a cesium vapor filled device operating at the same pressure.

A collector electrode having a monolayer of barium coated thereon will have a higher work function potential (2.11 ev.) than a corresponding collector electrode having a monolayer of cesium thereon (1.81 ev.). Thus, at typical high temperature operation of the collector, the undesirable back-thermionic emission from a barium coated collector will be much less than a cesium coated collector thereby allowing a gain in net output current.

The atomic weight of barium is 137.36 compared to the atomic weight of cesium which is 132.91. Since the ion current is inversely proportional to the square root of the electron-to-ion mass ratio, it is seen that the ion current with barium would be slightly less than the ion current with cesium at the same ion concentration.

The materials now presented for use as vapor within the converter will also provide for a substantially long converter life expectancy, since they are non-corrosive, having a lower affinity for oxygen whereby there will be no attack upon vapor compartment seals.

magnitude with identical emitter temperatures and materials.

Richardson's equation indicates that it is better to increase emission by raising the emitter temperature rather than by lowering the work function to amplify the work function difference between emitter and collector. Since the use of high temperatures in converters has in the past been limited by considerations of evaporation, workable current densities have been achieved only by using electrodes having work functions lower than those of conventional high temperature resisting materials such as refractory metals. The instant device may use refractory metal electrodes by reason of its operation with vapor pressures which are sufficiently high to cause a coverage or deposition of the vapor thereon. Table II as given below provides a delineation of electrode materials which may be used in accordance with the invention. The materials as listed therein must necessarily be selected for collector and emitter such that a proper relationship is retained between their respective work functions. All must have a substantially high melting point for modern industrial uses, which may range between 1500° K. and 3600° K. for emitter electrode and 750° K. and 1300° K. for collector electrode. In addition to showing these physical characteristics the tabulation also relates values for fractional ionization B of impinging atoms at the emitting electrode surface for three values of temperature.

TABLE II

| | Electrode Material | | | | | | | |
|---|---|---|---|---|---|---|---|---|
| | Cb | Ir | Mo | Pt | Re | Rh | Ta | W |
| Melting point, °K | 2,771 | 2,717 | 2,891 | 2,041 | 3,440 | 2,243 | 3,269 | 3,643 |
| Work function, 0 | 4.01 | 5.30 | 4.2 | 5.32 | 5.1 | 4.8 | 4.19 | 4.55 |
| | | | | 5.40 | | | | 4.639 |
| Transmission | 37 | 105 | 55 | 32 | 200 | 33 | 55 | .75 |
| | | | | 170 | | | | 212 |
| Constant A: | | | | | | | | |
| 1,600° K | 1/2,565 | 1/1.225 | 1/656 | 1/1.195 | 1/1.96 | 1/9.4 | 1/1,701 | 1/53 |
| 1,900° K | 1/666 | 1/1.256 | 1/211 | 1/1.217 | 1/1.866 | 1/6.4 | 1/226 | 1/26 |
| 2,200° K | 1/251 | 1/1.29 | 1/93.5 | | 1/1.803 | 1/4.9 | 1/98.5 | 1/20.6 |

Figure 2:
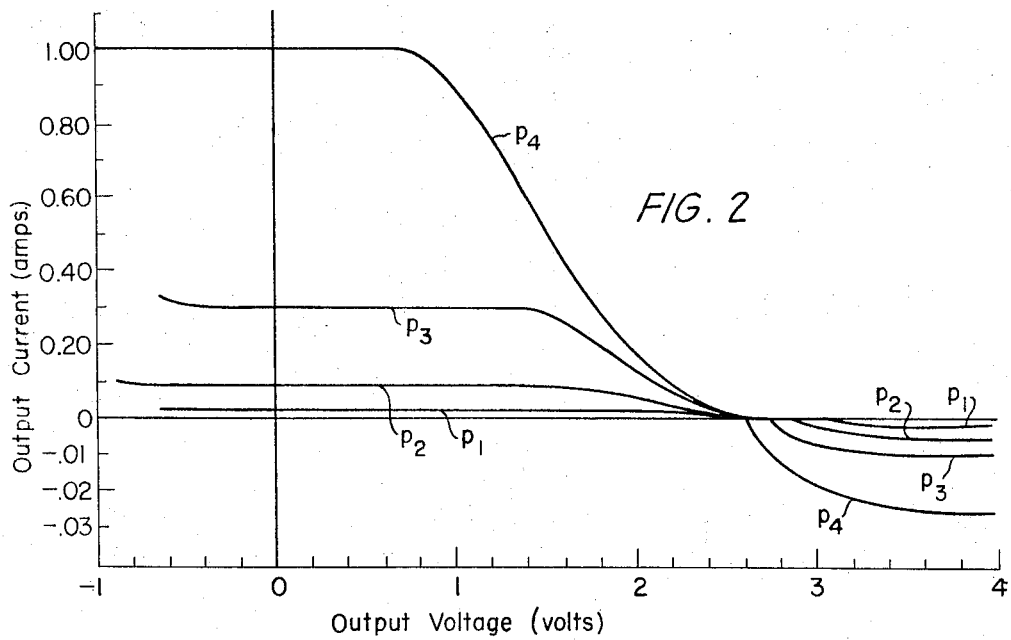

Referring to FIGURE 2 there is provided a series of measured characteristic current vs. voltage curves of a typical operation of the instant invention at one emitter temperature for four different values of barium pressures. The saturation current and output power increase by more than an order of magnitude with increasing barium pressures noted on $P_1$ through $P_4$. On the basis of the curve as represented in the figure, it is noted that barium ions are present within the converter and serve to neutralize the space charge. A measure of the ion current is provided by an extension of the characteristic curves past open circuit. The negative currents at voltage greater than about 2.8 volts indicate an ion current of approximately 2% to 8% of the saturation electron current. The shape of the characteristic curves is indicative that the space charge has been neutralized.

A substantial lowering of the emitter work function due to the contact potential associated with the adsorption of barium was obained. This is particularly significant since the barium vapor pressures, as previously discussed, are considerably lower than the cesium pressures required to obtain saturation electron currents of the same As described, the effectiveness of the emitter as a means of ionizing a vapor is closely dependent on work function. However, the desirable property for large electron emission, i.e., a low work function, is just the opposite of what is required for ionization, which takes place at a sufficient rate only if the work function is high. Previously, it has been assumed that a single hot surface may be utilized as both electron and ion emitter. However, in the instant invention due to the high ionization potential of the vapor involved and the electron emission considerations that indicate the requirement for a relatively low work function emitter, there may be provided a hot or emitting surface of two different materials, a high work function ionization region and a low work function electron emitting region. Materials for use in the ionizing region of the emitter electrode may be selected from a group including platinum, iridium, rhenium, rhodium, platinum-rhodium alloy, molybdenum, tantalum, columbium, tungsten, ruthenium, osmium or any combination alloys of these metals, while materials for use in the electron emitting region may be any of the above or comprise a material having a surface coating selected from a group including tantalum, tantalum carbide, hafnium carbide, tungsten, thoriated tungsten, molybdenum, rhenium, columbium, hafnium or a carbide of thorium or zirconium. The assembly of a cathode having a dual region surface arrangement may be accomplished by a variety of methods known to those skilled in the art. For example, the cathode may be fabricated such that its surface is of a grid-like configuration or pattern, the interstices of which retain characteristics suitable for one region while the raised portion is fashioned to have surface characteristics suitable as a second region. Depending upon parameters such as overall envelope configuration, electrode forms or operational environmental characteristics, the surface pattern may assume a variety of shapes, a regularly spaced, alternating pattern being deemed generally desirable, but not a prerequisite to successful operation. Materials for the surface of the collector are selectable from a much broader spectrum which will include nickel, stainless steel, copper, gold, silver or any of the materials listed as available in providing a surface of the emitting electrode, the choice being dependent upon the operating temperature of the heat sink of the converter.

The invention is further characterized by the accompanying example which is intended not to limit its scope but to further describe its operability.

EXAMPLE

A barium vapor-filled thermionic energy converter of design substantially as described hereinabove was constructed having an emitter electrode consisting of two materials, one serving as an electron emitter, the other as an ion generator. The basic structure of the emitter electrode, which when coated with adsorbed barium atoms served as the electron emitting portion, was fashioned of tungsten. The ionizing portion consisted of small dots of rhenium molded upon the base structure in essentially a uniform pattern. The collecting electrode was fashioned from nickel. The inter-electrode spacing was 40 mils. A deposition of barium was noted to exist on both emitting and collecting surfaces. Power densities of about four watts per sq. cm., with an efficiency of 10% were developed at a moderate emitter temperature of about 2000° K. at the optimum load.

Figure 3:
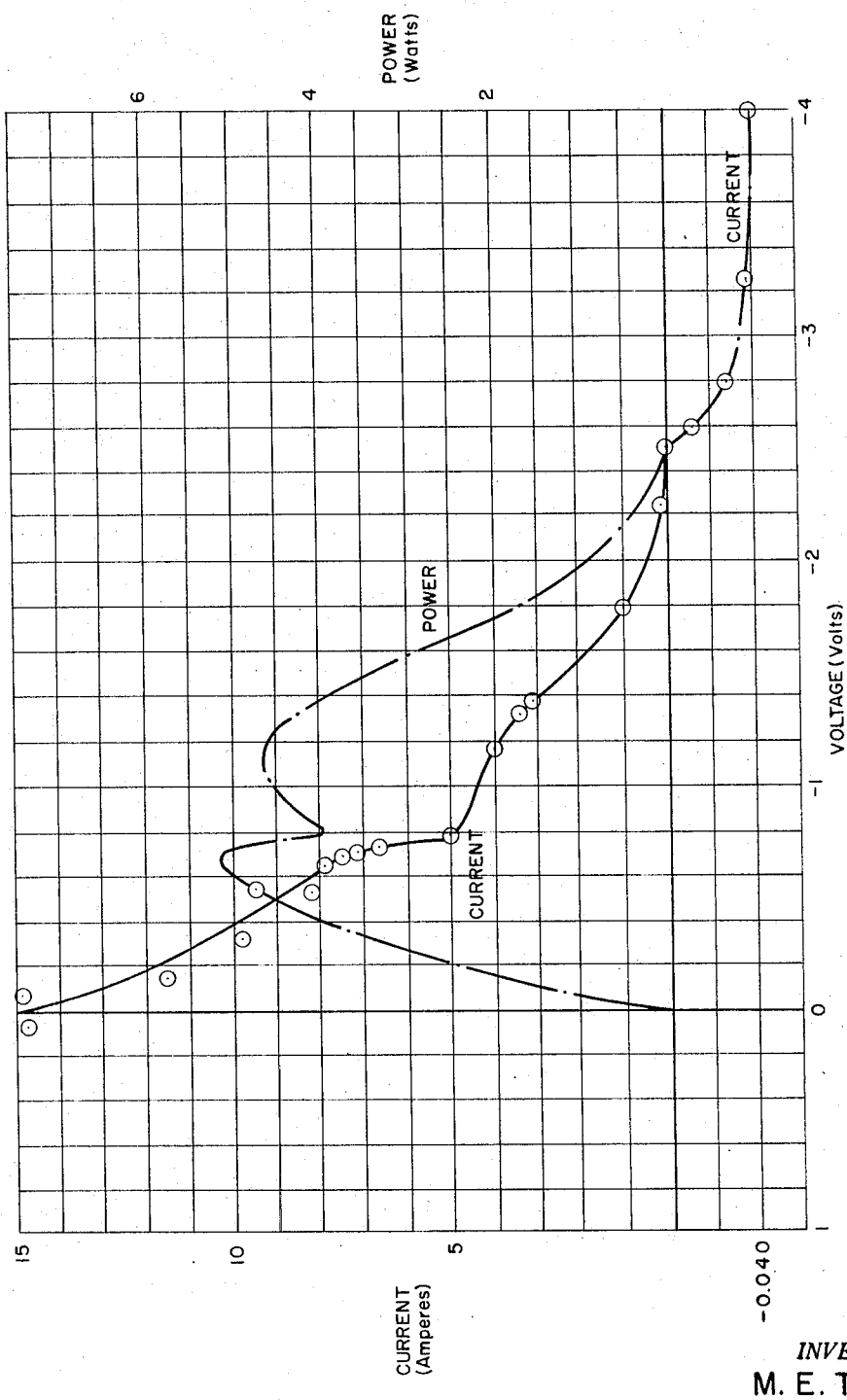
FIGURE 3 represents operational characteristic curves of the device as recorded in conjunction with the example.

Results of operation are further described in reference to FIGURE 3. The plasma characterized operation of the exemplar device may be noted along the current-voltage characteristic curve. Note that there are two modes of operations, one is a diffusion mode of operation and is exemplified by the portion of the current-voltage characteristic curve between the open circuit voltage of 2.5 volts and the load voltage of 2.79 volts. The second mode of operation occurs at load voltages less than 0.78 volt and is demonstrated by the sudden rise in the ouput current. In the diffusion mode of operation most of the ions are generated at the ionizing portion of the emitter electrode surface. While in the ignited mode of operation, ionization of the vapor has also taken place in the inter-electrode region by the high energy electrons of the Maxwellian velocity distribution of the electrons in the plasma. The fact that barium has a metastable state does aid in the ionization process both at the surface and in the inter-electrode region.

Observing that the scope of the invention may include converters using any of a large number of possible heat sources, it is not intended that it be restricted to the particular configuration as described and illustrated herein. Other equivalent modifications of the present structure may easily occur to those skilled in the art, all of which will fall within the spirit and scope of the present invention as set forth in the appended claims.

What is claimed is:
1. A thermionic device for converting thermal energy into electrical energy comprising:
   (a) A cathode formed having an electron emitting surface selected from the group consisting of: tantalum, niobium, molybdenum, tungsten, ruthenium, ozmium, thoriated tungsten, rhenium, columbium, hafnium, and carbides of thorium, uranium, zirconium, tantalum and hafnium, and an ionizing portion formed of regularly disposed regions in contact with said emitting surface said ionizing portion being selected from the group consisting of: tungsten, platinum, platinum-rhodium alloy, molybdenum, rhenium, rhodium, ruthenium, ozmium, tantalum, columbium, and iridium, said selected emitting surface having a lower work function than said ionizing portion work function;
   (b) An anode spaced from said cathode and having a surface work function value lower than that of said cathode, said anode being formed of a material selected from the group consisting of nickel, stainless steel, copper, gold and silver;
   (c) An ionizable vapor confined between said anode and said cathode and selected from the group consisting of: barium, strontium, lanthanum and calcium; and
   (d) Means for heating said cathode sufficiently to cause thermal emission of electrons from said electron emitting surface, said means also heating said ionizing portion to provide for contact ionization of said vapor, and said means also effecting the partial condensation of said vapor upon said cathode and anode surfaces, whereby the surface work functions of said cathode and anode are lowered by said condensate.
2. A thermionic device for converting thermal energy into electrical energy comprising:
   (a) A cathode formed having an electron emitting surface of tungsten and an ionizing portion of rhenium disposed upon and contacting said emitting surface in regularly spaced fashion;
   (b) An anode spaced from said cathode and formed of nickel;
   (c) A barium vapor confined between said anode and said cathode; and
   (d) Means for heating said cathode sufficiently to cause thermal emission of electrons from said electron emitting surface, said means also heating said ionizing portion to provide for contact ionization of said vapor, and said means also effecting the partial condensation of said vapor upon said cathode and anode surfaces, whereby the surface work functions of said cathode and anode are lowered by said condensate.

References Cited by the Examiner

UNITED STATES PATENTS

| | | | |
|---|---|---|---|
| 2,510,397 | 6/1950 | Hansell | 310—4 X |
| 2,975,320 | 3/1961 | Knauer. | |
| 2,980,819 | 4/1961 | Feaster | 310—4 |
| 3,021,472 | 2/1962 | Hernquist | 310—4 |

FOREIGN PATENTS

| | | |
|---|---|---|
| 1,242,179 | 12/1960 | France. |
| 919,148 | 2/1963 | Great Britain. |

MILTON O. HIRSHFIELD, *Primary Examiner.*

J. A. HINKLE, J. W. GIBBS, *Assistant Examiners.*